April 22, 1969    V. E. CALLAWAY ET AL    3,439,774
SOUND ENERGY ABSORBING APPARATUS Filed Jan. 21, 1966

INVENTOR.
VERNON E. CALLAWAY
LEONARD S. GORALSKI
BY

Robert B. Kinzler
ATTORNEY

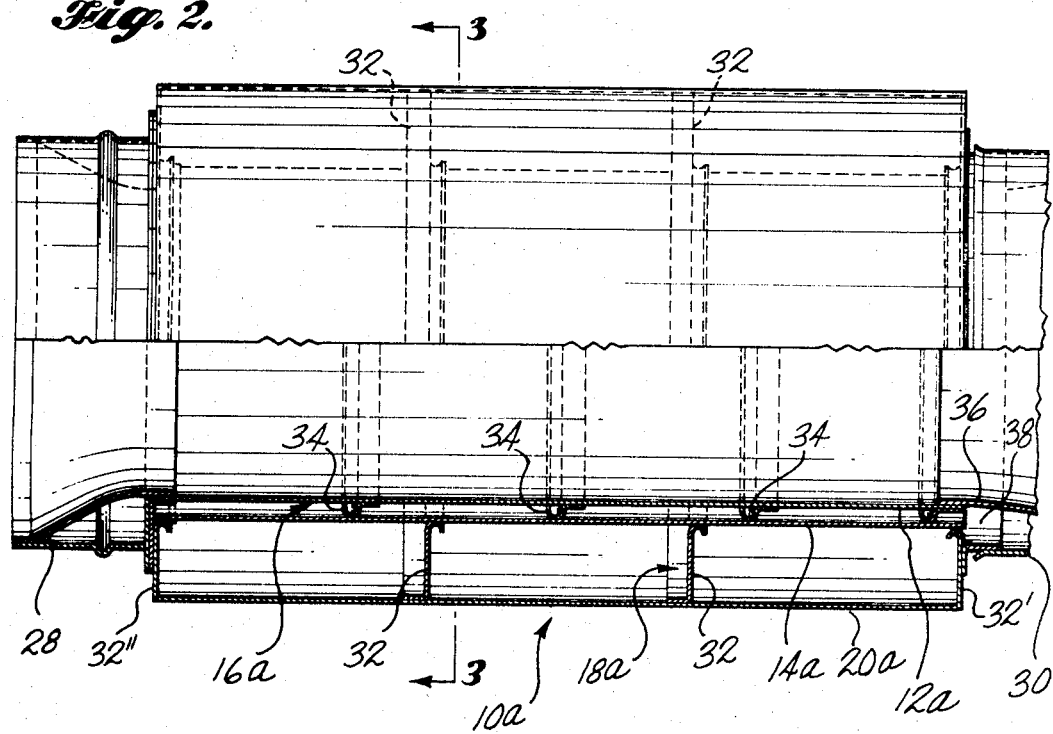
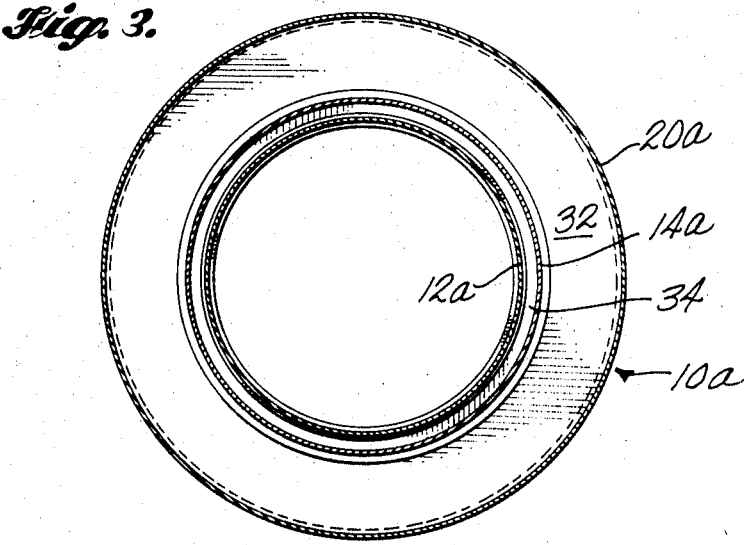

United States Patent Office 3,439,774
Patented Apr. 22, 1969

---

3,439,774
SOUND ENERGY ABSORBING APPARATUS
Vernon E. Callaway and Leonard S. Goralski, Tacoma, Wash., assignors to The Boeing Company, Seattle, Wash., a corporation
Filed Jan. 21, 1966, Ser. No. 522,127
Int. Cl. F01n 1/04
U.S. Cl. 181—42                                    1 Claim

ABSTRACT OF THE DISCLOSURE

A sound absorbing panel comprising two spaced layers of a microporous material, the outer layer being of a higher permeability for high frequency noise absorption, and the inner layer being of a lower permeability for low frequency sound absorption, with cellular structure placed between the two layers and between the inner layer and a supporting surface.

---

The present invention relates to a new and improved acoustical absorber.

It is a principal object of the present invention to provide an apparatus which is able effectively to absorb sound over a relatively broad band of frequencies, and which has many practical advantages that make the apparatus quite desirable in various applications. More particularly, it is possible, with this apparatus, to so select the component parts thereof that both minor and major adjustments can be made in the range of frequencies absorbed. Also, this apparatus can, without detracting from its effectiveness as a sound absorber, be made quite strong structurally, and be made of materials which can withstand various adverse conditions (e.g., high temperatures, contact with moisture or caustic fluids, etc.). Yet the apparatus is not impractical in terms of degree of compactness and weight. A further particular advantage is that this apparatus can be used to dampen the noise energy from a moving fluid such as a high velocity gas, without creating an excessively high drag on the fluid.

These and other objects and features of the invention will be more readily understood and appreciated from the following detailed description of the preferred embodiments thereof selected for purposes of illustration and shown in the accompanying drawings, in which:

FIGURE 2 is a side elevational view, partly in section, of the apparatus of the present invention installed in the exhaust duct of a turbine engine.

FIGURE 3 is a cross-sectional view taken on line 3—3 of FIGURE 2;

Figure 1:
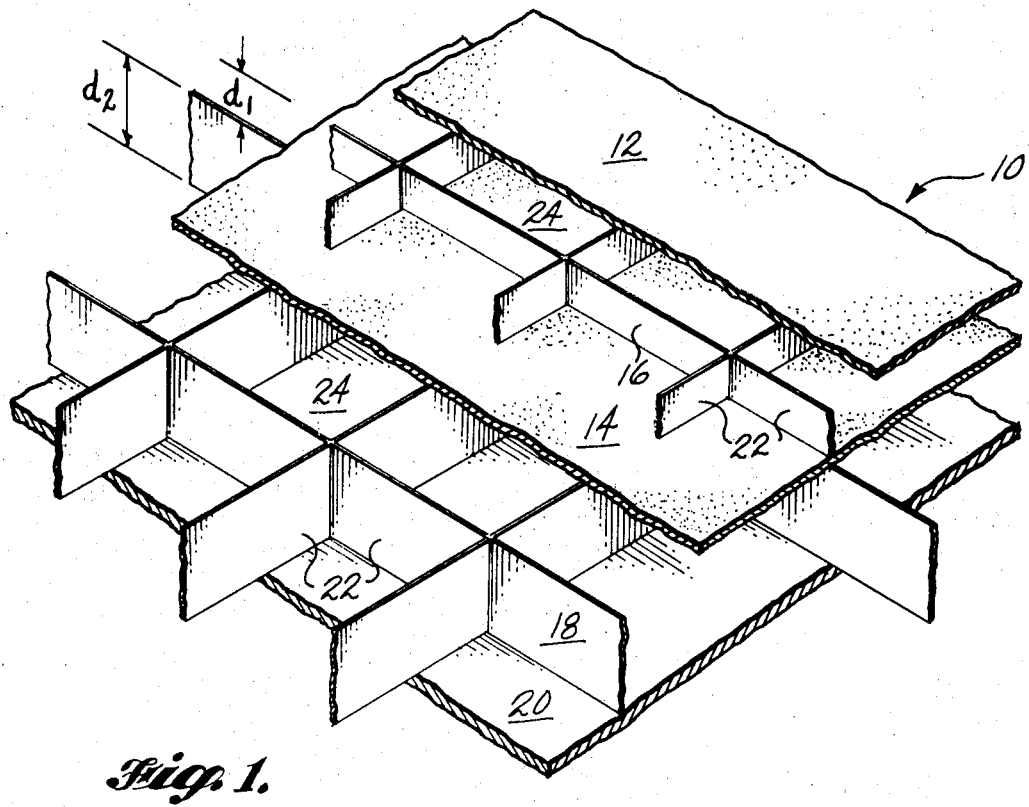
FIGURE 1 is a fragmentary perspective view of a panel embodying preferred teachings of the present invention.

Reference is made to FIGURE 1, wherein as illustrated a panel 10 made according to the teachings of the present invention. This panel 10 comprises a first exposed sheet or layer 12, a second inner layer or sheet 14 separated a predetermined distance from the first sheet 12 by means of a spacing structure 16, and a second spacing structure 18 which separates the second sheet 14 from a base member 20. This base member 20 will normally be a rigid non-porous structural member with respect to which it is desired to dampen sound energy, and on which the other component parts 12 through 18 are mounted. Each of the two sheets 12 and 14 are made of a micro-porous material, the compositions of which will depend upon the environment to which the panel 10 is subjected. For example, each of the sheets 12 and 14 can be a porous sheet of metal (e.g., stainless steel), the average pore size of which is perhaps in the order of 50 to 500 microns. In FIGURE 1, each of the spacing structures 16 and 18 is shown to be in the form of a cellular structure made up of a plurality of bands or ribbons 22 joined one to another in a grid-like configuration to form square cells 24, with the planes occupied by such ribbons being generally normal to the two sheets 12 and 14 and to the base member 20. These spacing structures can be made of metal, plastic, or some other suitable material.

To achieve the desired sound absorption characteristics, the first sheet 12 is made with a higher permeability and the second sheet 14 is made with a lower permeability. As will be disclosed hereinafter, the degree of permeability of each sheet 12 and 14 depends upon the desired frequency absorption range. Further, the depth of the second spacing structure 18 is desirably as great as, and preferably greater than, that of the first spacing structure 16.

While many of the effects which occur when sound energy impinges upon a panel made according to the present invention are very difficult to ascertain, and hence make a complete understanding of the same quite difficult, the following can be proposed with some justification. It can be assumed that the outer sheet 12, being more permeable, is better able to absorb sound energy of higher frequencies while permitting a large proportion of the sound energy of lower frequencies to pass therethrough. It can further be assumed that the second sheet 14, being less permeable, is better able to absorb the lower frequencies, while being less absorptive with respect to the higher frequencies. When sound energy of a predetermined frequency range within which it is desired to absorb the energy reaches the panel 10, it first contacts the outer sheet 12. Most of the lower frequency sound waves pass through this first sheet 12 to the second sheet 14 while a good portion of the higher frequency energy is absorbed in the first sheet 12. That portion of the higher frequency energy which passes through the first sheet 12 travels to the second sheet 14, which reflects back a good portion of this higher frequency energy. Desirably, the depth of the first spacing structure 16 is such that this higher frequency energy is reflected back to the first sheet 12 out of phase with the high frequency energy initially impinging upon the first sheet 12.

Probably the greater portion of the lower frequency energy initially passes into the second sheet 14, where a good portion of this lower frequency energy is absorbed. The rest of the energy travels on to the back place 20 and most of this energy is reflected back to the second sheet 14, where yet more of this lower frequency energy is absorbed. Also, the depth of the second spacing structure 18 desirably is such that this lower frequency energy is reflected back out of phase with the lower frequency energy initially impinging upon the second sheet 14. Since the lower frequency energy necessarily has a longer wavelength, it is to be expected that the width of the second spacing structure 18 (indicated at $d_2$) would be greater than that of the first spacing structure 16 (indicated at $d_1$), and experimental results substantiate the desirability of that construction in terms of sound absorption characteristics.

Very probably there are additional sound absorbing effects, possibly of some degree of significance in addition to those indicated above. For example, probably some of the high frequency energy which initially passes through both the sheets 12 and 14 is reflected off the base member 20 and comes back to the sheet 12 out of phase both with those high frequency waves initially impinging on the sheet 12 and those reflected immediately back from the second surface 14. It is to be understood, however, that regardless of the accuracy or correctness of any or all of the above-recited discussion of what is believed to be the sound absorbing effects of this apparatus, it has been found that when an apparatus is constructed as indicated herein, it does accomplish very effectively its intended sound absorbing functions.

FIGURES 2 and 3 illustrates a practical embodiment of present invention, in which the invention is utilized to dampen the noise emitted from the exhaust of a gas turbine engine. In describing this embodiment, those component parts which correspond functionally to the component parts of the panel shown in FIGURE 1 will be given like numerical designations, with an *a* suffix distinguishing those of the embodiment of FIGURES 2 and 3.

Thus, there is shown the end portion of a turbine engine exhaust manifold 28, to which is attached a noise absorbing unit 10a, having a generally cylindrical configuration. An exhaust pipe 30 is secured to the rear end of the unit 10a. This unit 10a comprises three concentric cylindrical portions: a first microporous sheet 12a of higher permeability, a second microporous sheet 14a surrounding the first sheet 12a and having a lower permeability, and a base sheet 20a enclosing the other two sheets 12a and 14a.

Secured to the inner surface of the base member 20a and extending radially inwardly therefrom are a plurality of annular flanges 32, which collectively function as a spacing structure 18a to maintain the cylindrical sheets 14a and 20a in properly spaced concentric relationship. In addition to this spacing function, the rear flange 32' is fixed secured to the front end of the pipe 30 so as to provide a mounting for the same. Also, the front flange 32" is fixedly secured to flange portions of the cylindrical sheets 12a and 14a to provide mounting means for the same, and is also secured to the manifold 28. A plurality of annular spacers 34 are provided between the two cylindrical sheets 12a and 14a and as shown herein are secured to the latter, and these serve the function of a spacing structure 16a between the sheets 12a and 14a.

It will be noted that the three cylindrical sheets are secured to one another only at the front end portions thereof. Thus, as hot exhaust gases pass from the manifold 28 through the unit 10a, the innermost sheet 12a can expand with respect to the second sheet 14a with the spacers 34 sliding over the sheet 14a, and the sheet 14a can in turn expand with respect to the base sheet 20a by sliding over the flanges 32. The exhaust pipe 30 is provided with a cylindrical liner 36, which with the pipe 30 defines an annular space 38 into which the rear end of the sheets 12a and 14a reach, this space 38 permitting the thermal expansion of the sheets 12a and 14a therein.

Figure 4:
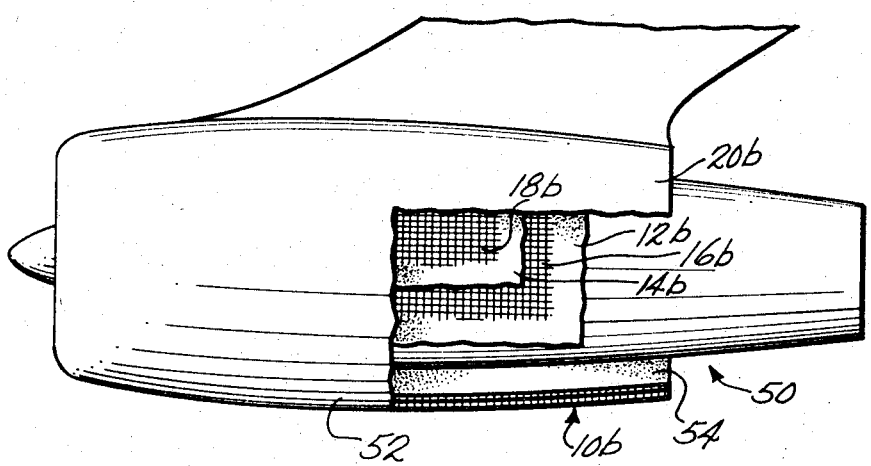
FIGURE 4 is a side elevational view, with portions thereof broken away, showing the apparatus of the present invention installed in the cowl of a fan jet engine.

In constructing this unit 10a, the sheets 12a and 14a were made of microporous stainless steel, the flow resistance of the sheet 12a being 10 rayls (a "rayl" as used herein being a c.g.s. rayl at a flow rate of 1000 standard cubic feet of air per hour per square foot), and the flow resistance of the sheet 14a being 52 rayls. The spacing between the sheets 12a and 14a was one-half inch and the spacing between the sheets 14a and 20a was two and one-half inches ith this unit so constructed and placed on the end of an exhaust manifold of a gas turbine engine, the noise from this engine was effectively attenuated to an appreciable degree FIGURE 4 shows yet another practical embodiment of the present invention, in which the invention is applied to the inside surface of the long duct cowl of a fan jet engine. As was done in describing the previous embodiment, those component parts of the present embodiment which correspond functionally to the component parts of the panel of FIGURE 1 will be given like numerical designations, with a *b* suffix distinguishing those of the present embodiment.

The engine is designated generally 50, and it has a long duct cowl 52 which defines the by-pass duct 54 of the engine. This cowl 52 serves as the base member 20b of the noise absorbing apparatus 10b, which is made up of microporous cylindrical sheets 12b and 14b along with spacing structures 16b and 18b, all of these components being arranged concentrically and bonded one to another to form a unitary cylindrical panel structure within the cowl 52. The spacing structures 16b and 18b are each a honeycomb-like structure having thicknesses of 3/8 inch and 1/2 inch, respectively. The innermost sheet 12b which is directly adjacent the by-pass stream of the engine, has a flow resistance of 10 rayls, and the sheet 14b has a flow resistance of 52 rayls. This unit 10b was found to be quite effective in reducing the noise level of the jet engine, and it did not detract noticeably from the performance of the engine.

To determine experimentally the sound absorbing characteristics of the present invention, a panel was constructed in the manner indicated previously herein, using "Feltmetal" (i.e., a microporous stainless steel material) for the two sheets, honeycomb for the two spacing structures, and a steel plate for the base member. The thickness of each spacing structure was one-half inch; the flow resistances of the outer and the inner sheets were, respectively, 7.5 and 54 rayls. A piece was cut from this panel and was placed at one end of an acoustic impedance tube, and the horn of the impedance tube (which is located at the opposite end) was operated at various frequencies. By measuring the amplitudes of vibrations at the nodes and anti-nodes of the resultant standing wave patterns in the tube, and by comparing the same, it was possible to calculate the normal incidence adsorption coefficient of the panel for various frequencies. These results are summarized in the accompanying graph of FIGURE 5, and it can be seen that there was effective sound absorption over a three octave range (a coefficient as high as 0.8 being considered as effective sound absorption).

Figure 5:
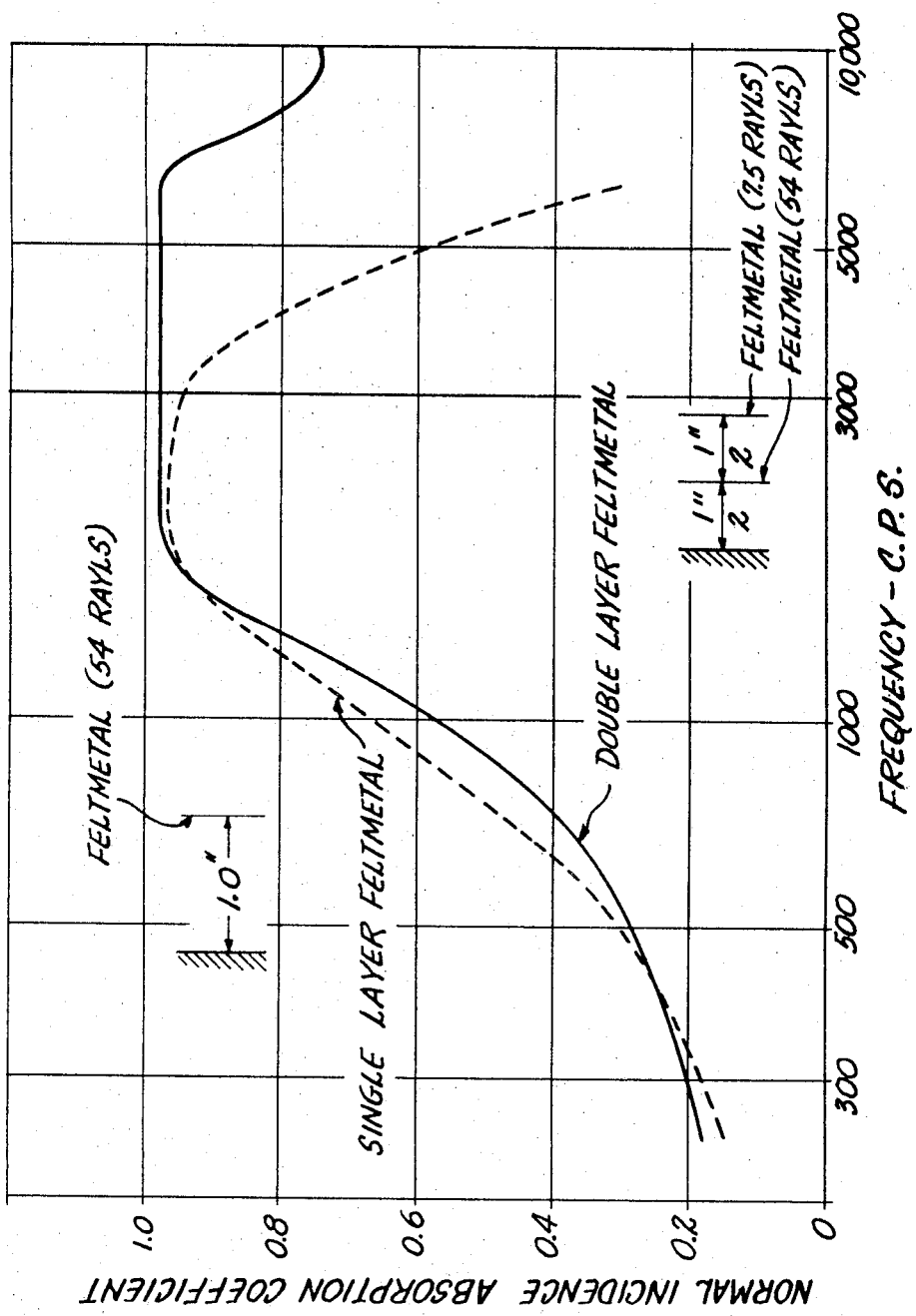
FIGURE 5 is a graph to illustrate the sound absorbing characteristics of the apparatus of an embodiment of the present invention.

For purposes of comparison, a panel was made of a sheet of "Feltmetal" having a resistance of 54 rayls and a one-inch thick honeycomb structure. The sheet was attached to the honeycomb which was in turn secured directly to a base sheet of metal. This panel was tested in an impedance tube as indicated above, and the results are also indicated in the graph of FIGURE 5. It can be seen that with this latter arrangement, there was effective sound absorption over a much narrower frequency range.

As indicated previously, a panel made according to the present invention can be tuned to a certain predetermined range of frequencies (i.e., be made to absorb sound within a certain range of frequencies) by selecting sound absorbing sheets of different permeabilities and selecting spacing structures of various depths. Also, although in the embodiments shown herein, air was the fluid medium from which sound energy was being absorbed, it is to be understood that the present invention could be used as a sound energy absorbing apparatus for other fluid mediums. In general, it can be stated that to dampen sound of a predetermined frequency range for other fluid mediums, the permeability of the sound absorbing sheets will be varied generally in proportion to the ratio of the specific impedance of such mediums to the specific impedance of air.

Now therefore, we claim:

1. An apparatus to absorb sound energy within a predetermined frequency range, said range having a lower frequency range portion and a higher frequency range portion, said apparatus comprising:
   (a) a first outer microporous sheet member having a higher permeability such as to be more highly absorptive with respect to sound energy in said higher frequency range portion,
   (b) a second inner microporous sheet member underlying said first sheet and having a lower permeability such as to be more highly absorptive with respect to sound energy in said lower frequency range portion, (c) a substantially impervious base member underlying said second sheet,
(d) a first spacing means having a predetermined thickness and located between said first and second sheets to separate said first and second sheets a predetermined distance,
(e) a second spacing means having a predetermined thickness and located between said second sheet and said base member to separate said second sheet from said base member a predetermined distance, and
(f) one of said spacing means being a cellular structure, having its cell alignment generally normal to its adjacent members.

References Cited

UNITED STATES PATENTS

| | | |
|---|---|---|
| 2,934,891 | 5/1960 | Brown. |
| 3,113,634 | 12/1963 | Watters _____ 181—50 XR |
| 3,263,771 | 8/1966 | Seifert _____ 181—42 |
| 3,286,786 | 11/1966 | Wirt _____ 181—50 |
| 3,286,787 | 11/1966 | Wirt _____ 181—50 XR |

FOREIGN PATENTS 829,012  2/1960  Great Britain.

ROBERT S. WARD, Jr., *Primary Examiner.*

U.S. Cl. X.R.

181—48, 55, 71